W. J. Dodge,
Evaporator.

No. 95,668.          Patented Oct. 12, 1869.

Witnesses.          Inventor.
R. Hirsh          Wm James Dodge
Joseph Pfohl

United States Patent Office.

WILLIAM JAMES DODGE, OF SYRACUSE, NEW YORK.

Letters Patent No. 95,668, dated October 12, 1869.

IMPROVEMENT IN EVAPORATING SALT WATER, &c.

The Schedule referred to in these Letters Patent and making part of the same.

*To all whom it may concern:*

Be it known that I, WILLIAM JAMES DODGE, of Syracuse, in the county of Onondaga, and State of New York, have invented a new and improved Method of Evaporating Salt Water, &c.; and I do hereby declare that the following is a full, clear, and exact description thereof, which will enable those skilled in the art to make and use the same, reference being had to the accompanying drawing, forming part of this specification, in which—

Similar letters of reference indicate like parts.

My invention consists in evaporating salt water or other liquids by forcing a current of air through the same, and is used as an auxiliary to boiling, or to solar evaporation, as hereinafter more fully explained.

In the accompanying drawing—

A is an ordinary kettle;

B is the mason-work of the arch; and

C is the fire-space.

Figure 2:
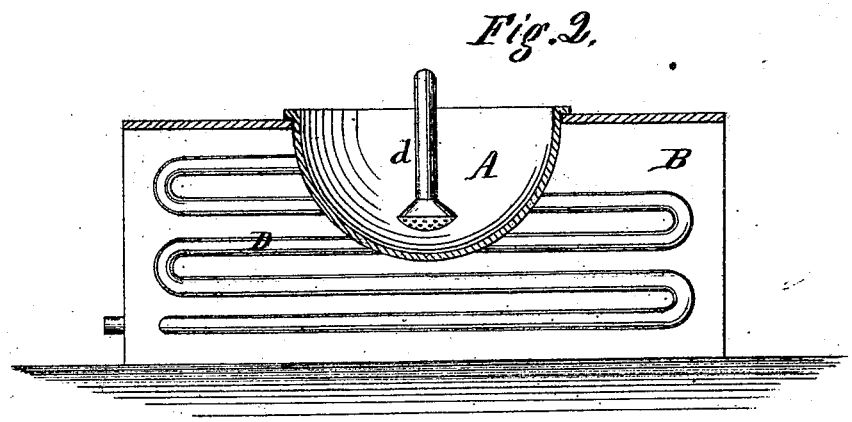
Figure 2 is a longitudinal section of the same with my improvement.

Along the sides of the arch in the fire-chamber or space, I arrange one or more air-pipes, D, as seen in fig. 2, one end of the pipe terminating in the kettle A with a rose-head.

While the liquid in the kettle is being boiled, a current of air is driven through the pipe D, and, in passing through the fire-chamber, becomes highly heated, and its absorbent power greatly increased. It is then discharged into and rises through the liquid in the kettle, and, becoming fully saturated or loaded with vapor, it is discharged into the atmosphere.

The side walls of the arch may be made hollow, and a chamber formed, for heating the air on its way from the blower to the kettle, and much of the pipe D thereby dispensed with.

Figure 1:
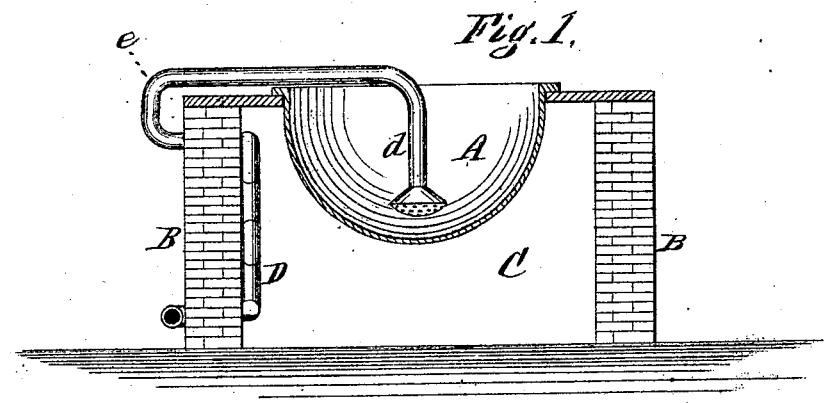
Figure 1 is a cross-section of an ordinary arch for boiling salt.

The discharge-end of the pipe can also have a swivel-joint, at *e*, fig. 1, so that the rose-head *d* can be turned up out of the way readily, when desired to remove the salt, or peck out the scale, &c.

This auxiliary process can be applied to solar vats, but is chiefly designed to be used in connection with the boiling-process.

By these means, the economy of manufacture is largely increased, with a light additional cost of apparatus.

A current of cold air, or at the temperature of the atmosphere, can be used in connection or auxiliary to solar evaporation; but hot air is, in all cases, preferable, where the same can be applied.

I do not wish to confine myself to the particular construction of apparatus shown, as any of the known and suitable devices for heating the air and securing its rapid and thorough circulation through the fluid can be used; but

What I claim, and desire to secure by Letters Patent, is—

The use of currents of air, forced into and discharged through the liquid to be evaporated, in connection with or as auxiliary to the ordinary boiling or solar-evaporation methods, substantially as described.

WM. JAMES DODGE.

Witnesses:
R. HIRSH,
JOSEPH PFOHL.